Sept. 1, 1936.   W. C. WAGNER ET AL   2,052,733
ANTITAMPERING METER
Filed Aug. 16, 1933   4 Sheets-Sheet 1

Inventors
Walter C. Wagner
and George B. Schleicher,
By Augustus B. Stoughton
Attorney Sept. 1, 1936.  W. C. WAGNER ET AL  2,052,733
ANTITAMPERING METER
Filed Aug. 16, 1933  4 Sheets-Sheet 2
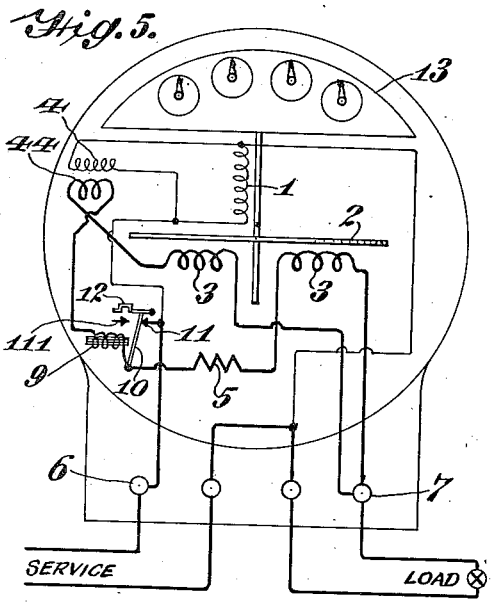
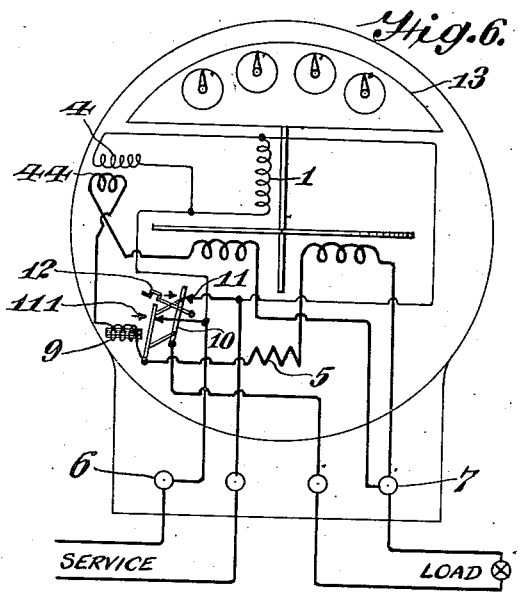
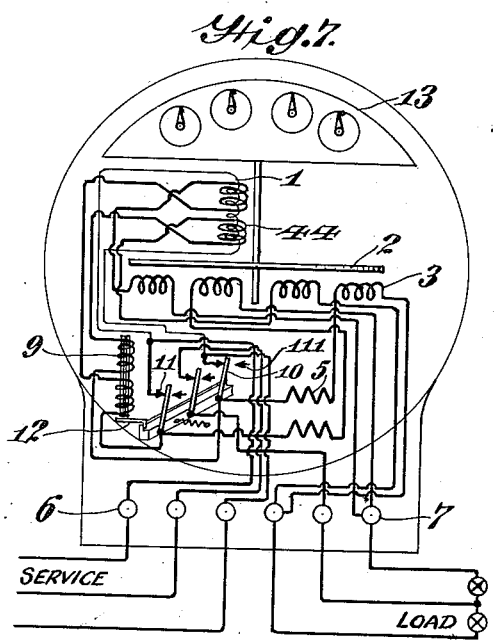
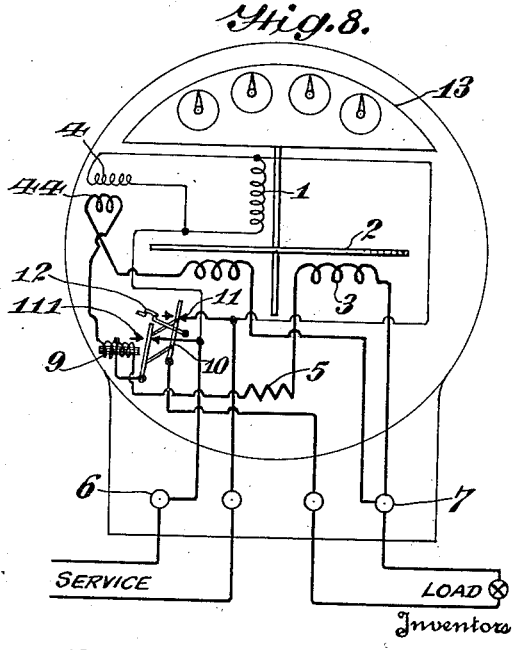
Inventors
Walter C. Wagner
and George B. Schleicher,
By Augustus B. Stoughton
Attorney Sept. 1, 1936.  W. C. WAGNER ET AL  2,052,733
ANTITAMPERING METER
Filed Aug. 16, 1933    4 Sheets-Sheet 3
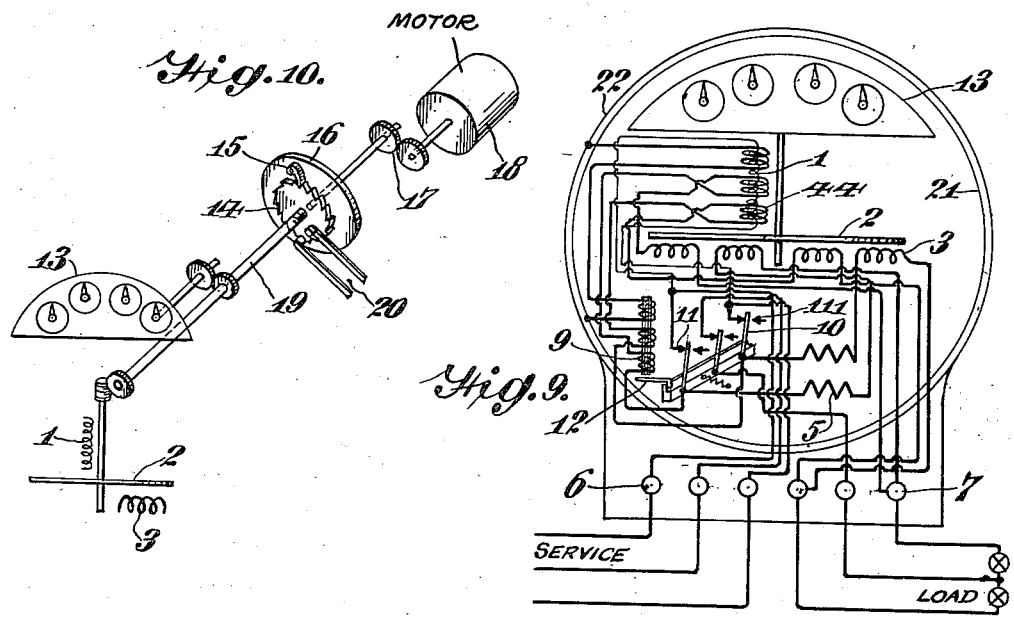
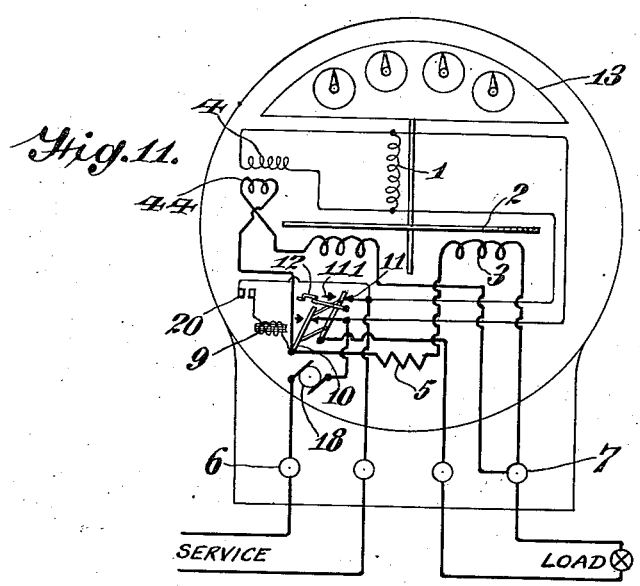
Inventors
Walter C. Wagner
and George B. Schleicher,
By Augustus B. Stoughton
Attorney Sept. 1, 1936.  W. C. WAGNER ET AL  2,052,733
ANTITAMPERING METER
Filed Aug. 16, 1933  4 Sheets-Sheet 4
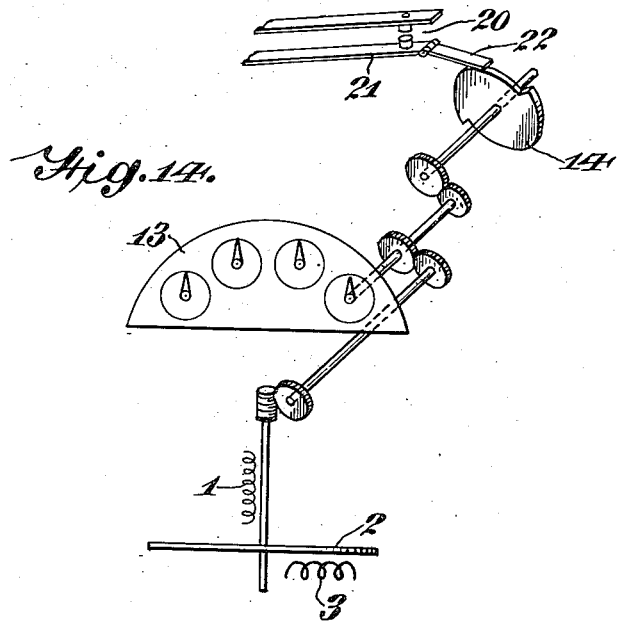
Fig. 14.
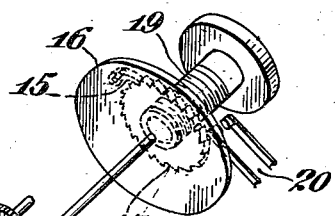
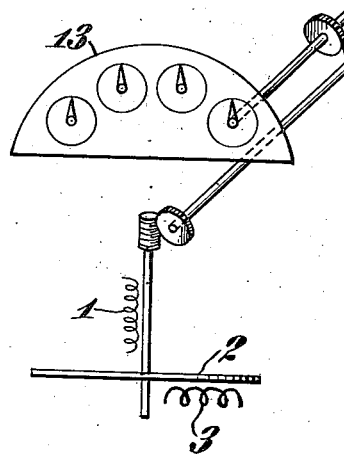
Fig. 12.
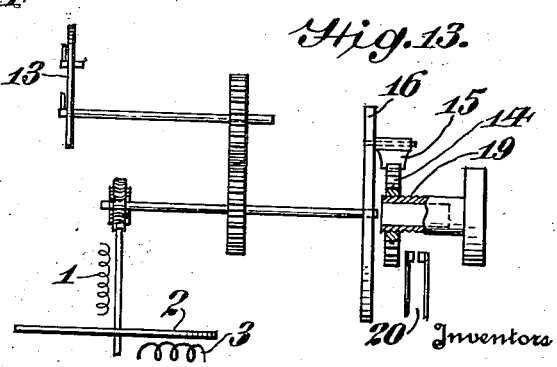
Fig. 13.
Inventors
Walter C. Wagner
and George B. Schleicher,
By Augustus B. Stoughton
Attorney Patented Sept. 1, 1936

2,052,733

UNITED STATES PATENT OFFICE 2,052,733

ANTITAMPERING METER

Walter C. Wagner, Ardmore, Pa., and George B. Schleicher, Clementon, N. J.

Application August 16, 1933, Serial No. 685,402

13 Claims. (Cl. 171—34)

This invention relates to integrating electrical meters, particularly watthour meters, and its object is to make more difficult interference with registration by unauthorized persons. The invention covers new and novel means of protection against the placing of "jumpers" on current coils, the unauthorized stopping of the meter disk while load is being supplied, and against reverse operation of the meter register.

The principles involved are capable of application in various ways, and a number of means of accomplishng the results are given as examples of the principles involved rather than in the form of specific construction details.

The invention will be described in connection with the accompanying drawings forming part hereof and in which Figure 1 is a diagrammatic and schematic view illustrating the jumper-proof feature of the invention using a separate circulating current transformer.

Fig. 5 is a similar view illustrating a circulating current jumper-proof construction adapted to open one side of the line.

Fig. 6 is a view similar to Fig. 5 but adapted to open both sides of the line.

Fig. 7 is a similar view illustrating a three wire meter of the type referred to with a three pole latched relay.

Fig. 8 is a similar view illustrating a differential coil in the relay to prevent unintentional operation due to overloads and short circuits.

Fig. 9 is a similar view illustrating jumper-proof and drill proof features using the meter potential coil as the primary of the low voltage transformer.

Fig. 10 is a diagrammatic perspective view illustrating an overrunning ratchet mechanism operated by a motor when the meter disk is stopped or reversed.

Fig. 11 is a view similar to Fig. 1 but also illustrating the location of the motor shown in Fig. 10 in the circulating current circuit.

Fig. 12 is a view similar to Fig. 10 and illustrating ratchet mechanism operatable by reverse rotation of the meter disk.

Fig. 13 is a side elevation of the mechanism shown in Fig. 12, and

Fig. 14 is a view similar to Fig. 12 illustrating a modification.

Figure 1:
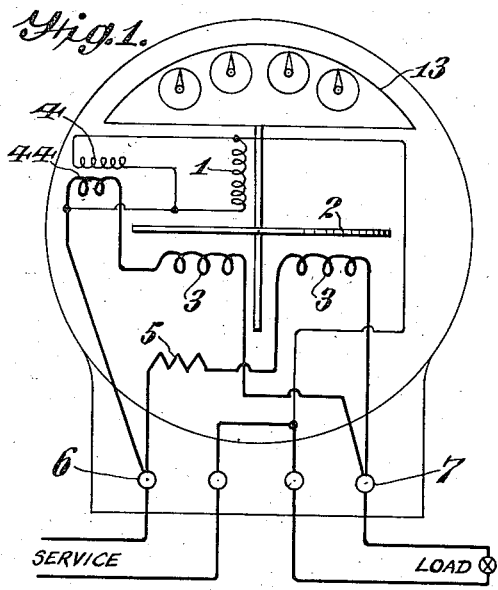

One method of making a meter "jumper-proof" consists of increasing the meter speed when a "jumper" (i. e. a short circuit around a current coil) is applied, instead of reducing the speed as in the ordinary meter. A method of accomplishing this is shown in Fig. 1, which shows a two-wire "jumper-proof" meter. A standard potential coil 1 and a current coil 3 of an induction watthour meter are arranged in operative relation to disk 2 which drives register 13. A small transformer has its high-voltage winding 4 connected in parallel with potential coil 1, and the low-voltage winding 44 may supply a relatively large current at a low voltage. Current coil 3 differs from the standard current coil of a two-wire meter in that it consists of two windings, each having an equal number of turns. One of these windings is connected in series with resistor 5, and the other is connected in series with the low-voltage winding 44 of the transformer. Both circuits are connected between the normal current terminals 6 and 7 of the meter, so that the two sections of current coil 3 are connected in parallel with respect to load currents, but in series and with reversed polarity with respect to each other.

In operation the low-voltage transformer supplies a circulating current through the two current coils in a direction so that the resultant magnetic effect of the current coils is zero. Resistor 5 serves to limit the normal circulating current to the desired value, but may be omitted if the impedance of the coils themselves is sufficiently high. When a jumper is placed across terminals 6 and 7, resistor 5 and the current coil in series with it are short-circuited, which results in an increase in circulating current through only one winding of current coil 3. The polarities of the individual coils and of the transformer are arranged so that the current coil in series with the transformer secondary causes the meter to rotate in a forward direction. It is apparent that the meter will rotate continuously as long as the jumper remains connected, thus resulting in continuous registration for this condition. Transformers 4 and 44 may be mounted within the meter case, or may be mounted separately in any way which is inaccessible to unauthorized persons. In the design of the elements, it is advantageous to provide sufficient circulating current to operate the meter at a speed in excess of that represented by normal maximum load conditions.

Figure 2:
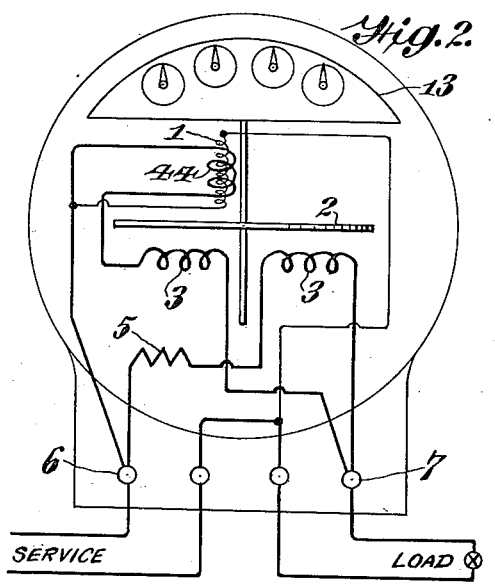
Fig. 2 is a similar view in which the circulating current transformer is combined with the meter potential coil.

An alternative arrangement to that shown in Fig. 1 consists of combining the low-voltage transformer with the meter potential coil, and this arrangement is shown in Fig. 2. The circuit is entirely similar to that of Fig. 1, except that potential coil 1 serves also as the high-voltage winding of the transformer, and the low-voltage winding 44 is wound on the same core as the potential coil.

Figure 3:
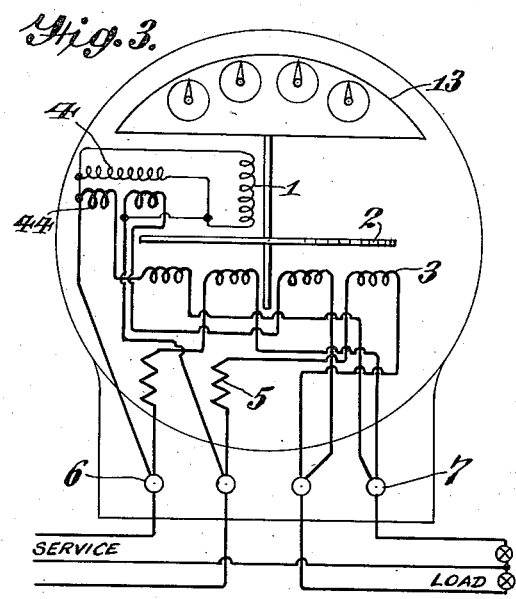
Fig. 3 is a view similar to Fig. 1 showing an adaptation to a three wire meter using two circulating current transformers.
Figure 4:
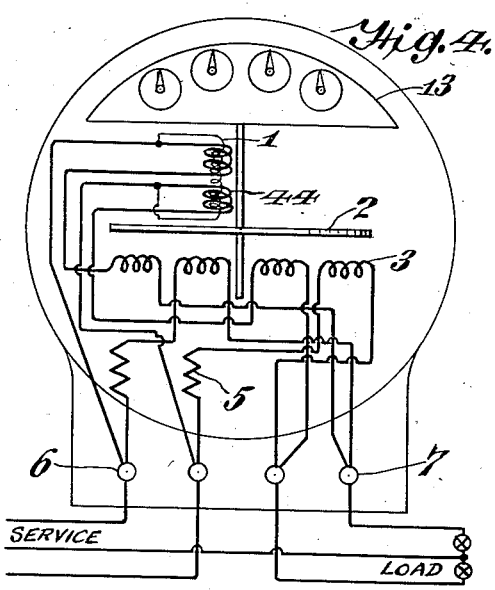
Fig. 4 is a view similar to Fig. 2 showing an adaptation to a three wire meter using the meter potential coil as the primary of the circulating current transformer.

The application of the invention is possible also in a three-wire meter, and an arrangement comparable to Fig. 1 is shown in Fig. 3. The low-voltage transformer in this case consists of one high-voltage winding 4 and two low-voltage windings 44. The latter are insulated from each other. The current coils consist of four independent windings, each having an equal number of turns. Each pair of coils operates in accordance with the principles described in detail for Fig. 1. In normal operation it is apparent that the load current will divide between the two current coils connected to the same meter terminals, and these coils are arranged so that the effect of these current coils is cumulative for load current, but differential for circulating current. Fig. 4 shows the connections for a three-wire meter in which the two low-voltage windings of the circulating current transformer have been combined with the meter potential coil.

A variant of the principles described consists of using the change in circulating current when a jumper is applied for the operation of a relay which may open the load circuit. Such an arrangement is shown in Fig. 5. The numerical designations are the same as in Fig. 1, but the connections are such that the meter rotates in the reverse direction when the jumper is applied. When this occurs the increase in circulating current operates the relay, which may consist of a coil 9, an armature 10, contacts 11 and 111, and a latch 12. The relay in Fig. 5 opens only one side of the line, and hence the load circuit is interrupted only when the jumper is removed. Fig. 6 shows a relay which opens both sides of the line. In the design of the meter the circulating current is adjusted so that the relay remains normally inoperative. The increase in circulating current, however, produced by the application of a jumper will cause relay coil 9 to attract armature 10, open contact or contacts 11 and be locked in the open position by latch 12. Resetting the relay to normal requires the opening of the meter, and this is accomplished by lifting latch 12, which causes armature 10 and contacts 11 to assume their normal positions. If the position of the relay is such that latch 12 is inaccessible to authorized persons, an extension of the latch or a simple mechanical linkage (not shown) may be added. Contacts 11 may consist of a single set of contacts to open one side of the line, or a multiplicity of sets of contacts may be applied to open the desired number of lines.

The relay arrangements of Figs. 5 and 6 indicate the principle of the arrangement desired, and in practice other arrangements of the parts are possible. Fig. 7 shows the application of a relay to a three-wire meter, and also an example of an alternative relay construction in which coils 9 attract armature 12 which is made in the form of a latch whose operation releases the contact arm and opens contacts 11. Contacts 11 are normally held in the closed position by the latch attached to armature 12. Resetting is accomplished by moving armature 10 to the inoperative position in which it is held by latch 12 until the next operation of the relay. As in the case of the relay in Fig. 6, multiple contacts may be provided for opening the desired number of lines. The principle of relay construction shown in Fig. 7 is interchangeable with that shown in Figs. 5 and 6, and in the succeeding figures the two forms are used interchangeably. Fig. 7 shows the application of the relay to a three-wire meter in which the low-voltage transformer is combined with the meter potential coil.

Other variations are possible in the arrangement of the relay circuits, and instead of causing the jumper to increase the speed of the meter or to disconnect the service, the relays of Figs. 5, 6, 7, 8, 9, or 11, may be arranged to close a circuit which would operate any desired device; for example, a flasher, buzzer alarm or light, or they may open the potential circuit of the meter to facilitate the discovery of the tampering due to the absence of registration. Contacts 111 Fig. 8, are used for this purpose, and if this feature is not desired these contacts may be omitted; similarly, when contacts 111 are used contacts 11 may be omitted and the connections changed accordingly if the interruption of the service is not desired. Both features may be applied if desired.

Fig. 8 includes a further refinement in relay construction and is designed to avoid the possible operation of the relay under conditions of extreme overload or short circuits. The general arrangement is comparable to Fig. 6, but relay coil 9 is wound in two parts, each consisting of an equal number of turns, arranged so that the effects of load current tend to neutralize, but circulating current through one winding will operate the relay. This form of coil arrangement is equally suitable for the circulating current relays shown in all of the other figures. For three-wire meters (details not shown) relay coil 9 may consist of two independent windings each provided with a mid-tap, or four windings properly interconnected may be used.

Another anti-tampering feature, for which protection is advantageous, consists of the unauthorized stopping of the disk. This is generally accomplished by drilling a hole into the meter cover or base and inserting a wire or other obstruction through the hole. One method of protecting a meter against this form of tampering consists in providing the meter with a metal inner or outer shell. Fig. 9 shows the elements of a four-winding transformer combined with the meter potential coil arranged to protect the meter against the application of a "jumper" and also against drilling through the cover. In this case, a relay in accordance with either Figs. 5, 6, 7, or 8 is arranged with an additional coil, so as to operate either upon the application of a "jumper" or upon drilling the cover.

An alternative means of protecting the meter against the stopping of the disk is shown in Fig. 10, which utilizes an overrunning ratchet for closing a contact to operate a relay. In Fig. 10, the meter consists of potential coil 1, disk 2, and current coil 3, and register 13. Attached to a shaft of the dial train is a ratchet wheel 14; a pawl or pawls 15 are attached to a wheel disk or other means of support 16 which is driven through suitable gearing 17 by motor 18. Motor 18 is connected into the current circuit of the meter, and the gearing is arranged so that ratchet wheel 14, and the disk and pawl assembly 15 and 16 normally operate in the same direction. Pawl 15 and wheel 16, however, for all conditions of load rotate at a slower speed than ratchet wheel 14. Hence the meter register may be driven proportionately to the speed of the meter disk under normal conditions, but if meter disk 2 is stopped while load is being supplied motor 18 will drive pawl 15 against ratchet wheel 14. Ratchet wheel 14 is attached to shaft 19 by means of a thread on shaft 19. Motor 18, therefore, will turn ratchet wheel 14 and move it laterally along shaft 19. The lateral motion of wheel 14 will close contacts 20 which in turn may operate a relay in accordance with that of Figs. 5, 6, or 7. In the arrangement shown, the motor is connected in series with the current circuit so that it will operate only when load is being supplied. Fig. 11 shows typical electrical connections for the mechanical arrangement whose principle is shown in Fig. 10.

It is possible also to arrange a motor so as to be connected into the circulating current circuit of Figs. 1, 2, 3, 4, or 5, in which case the motor may serve to operate a relay in accordance with Figs. 5, 6, or 7 to open the load circuit when a "jumper" is applied. Fig. 11 shows an example of this connection.

Methods of protecting a meter against reverse rotation are shown in Figs. 12, 13 and 14. Reverse rotation may be produced by the application of a jumper to the meters of Figs. 5, 6, 7, 8, 9 and 11. Fig. 12 shows an alternative arrangement to those previously described for operating a relay in the load circuit or for placing an alarm or signal in operation.

In Fig. 12, a meter element represented by potential coil 1 current coil 3 disk 2 and register 13, has attached to a shaft in register 13 a disk or wheel 16 on which is mounted a pawl or pawls 15 in operative relation to ratchet wheel 14. The parts are arranged so that with the normal direction of operation of the meter register, pawls 15 ride over the ratchets on ratchet wheel 16. Reverse operation however will cause pawls 15 to engage ratchet wheel 14 and drive it in the same direction as the rotation of disk 16. Ratchet wheel 14 is free to rotate on a threaded support 19 so that the rotation of ratchet wheel 14 will cause its lateral motion on shaft 19. Such motion results in the closing of contact 20 which may operate a relay of similar construction to those of Figs. 5, 6, 7, or 9. The arrangement of the ratchet and contact arrangement is shown in greater detail in Fig. 13.

An alternative arrangement to Figs. 12 and 13 accomplishes the same results in a slightly different way. In Fig. 14 ratchet wheel 14 is mounted on a shaft in or geared to register 13 in operative relation to contact 20. The movable contact arm 21 carries a hinged section 22 which rides over the cams of ratchet wheel 14 as long as rotation is in the normal direction. If the direction of rotation of cam 14 reverses however, cam 14 engages hinge 22 causing movable contact arm 21 to close contact 20, which in turn serves to operate a relay of the general construction of those shown in Figs. 5, 6, 7, or 9.

It is apparent that a great variety of combinations is possible in applying the various individual protective features to a particular meter. No attempt has been made to illustrate all possible combinations, or to describe in detail all of the various mechanical arrangements which will serve to utilize the principles disclosed in this invention. The invention relates particularly to new and novel principles of protection, and the mechanical details herein described are intended to serve only as typical examples of practical arrangements which permit the application of these novel principles. The inventive thought of this application however includes all methods of applying these principles to electric meters.

It will be obvious to those skilled in the art that modifications may be made in details of construction and arrangement and in matters of mere form without departing from the spirit of the invention which is not limited to such matters, or otherwise than the prior art and the appended claims may require.

We claim:

1. In an induction watthour meter having a register mechanism, a disk for driving said register mechanism, and current terminals; the combination of a voltage coil, a current coil constructed of two sections each having an equal number of turns and arranged in operative relation to the disk, a transformer having a high voltage winding connected across said voltage coil, and having a low voltage winding connected in series with one section of said current coil, a resistor connected in series with the second section of said current coil, and current coil circuits both connected in parallel with respect to the current terminals of the meter but forming a closed series circulating current circuit between themselves.

2. In an induction watthour meter having a register mechanism, a disk for driving said register mechanism, and current terminals; the combination of a voltage coil, a current coil constructed of two sections each having an equal number of turns and arranged in operative relation to the disk, a transformer having a high voltage winding connected across said voltage coil, and having a low voltage winding connected in series with one section of said current coil, and current coil circuits both connected in parallel with respect to the current terminals of the meter but forming a closed series circulating current circuit between themselves.

3. In a three wire induction watthour meter having a register mechanism, a disk for driving said register mechanism, and current terminals; the combination of a potential coil, a current coil consisting of four equal insulated sections each having an equal number of turns and arranged in operative relation to the disk, resistors, a transformer consisting of a high voltage winding connected across the terminals of the potential coil, and two low voltage windings insulated from each other, each of said low voltage windings connected in series with one section of said current coil and each of the other two sections of said current coil connected in series with a resistor, and each of the two pairs of current coils connected in parallel with respect to their respective external current terminals but in series with respect to each pair of current coils and the corresponding low-voltage windings of said transformer.

4. In a two wire induction watthour meter having a registering mechanism, a disk for driving said registering mechanism, and current terminals; the combination of a voltage coil, a current coil constructed of two sections each having an equal number of turns and arranged in operative relation to the disk, a transformer consisting of a high voltage winding connected across the terminals of said voltage coil and a low voltage winding connected in series with one section of said current coil, a resistor connected in series with the second section of said current coil, and both current coil circuits connected in parallel with respect to the current terminals of the meter but forming a closed series circuit between themselves.

5. In the combination described in claim 2, the addition of a relay in the circulating current circuit, said relay consisting of a latched armature and a coil arranged in operative relation to the latched armature, and contacts operated by the armature.

6. In an induction watthour meter in accordance with claim 2 and in which there is reverse rotation with respect to normal of a rotating part, the addition of a contact, actuating means connected with said part and responsive to reverse rotation of said part and operative to close said contact, and a latched relay connected with said contact.

7. In an induction watthour meter in accordance with claim 2, the addition of a relay and contacts arranged in operative relation to a rotating part of said meter so that reverse rotation with respect to normal of said rotating part will close said contacts which in turn operates the relay contacts, said relay being provided with a latch which will keep said relay contacts in the open position after its initial operation, with means for resetting said relay to its original position.

8. In the combination of claim 2, a relay in which the operating coil of said relay consists of at least one set of windings, one coil of each set of windings being connected in the circulating current circuit, and the other coil of each set of windings being connected in circuit between the source of the difference of potential and a terminal of the meter.

9. In an induction watthour meter in accordance with claim 2 and which is adapted to operate upon unauthorized interference with rotation of a part of the measuring structure of said meter, the combination with said measuring structure of an overrunning ratchet drive mechanism of which one member has screw-thread relation to said measuring structure; a motor for driving the other member at a slow speed in respect to the normal speed of said part of the measuring structure, and a contact operatively arranged in respect to said part.

10. In an induction watthour meter having a register mechanism, a disk for driving said register mechanism, and current terminals; the combination of a voltage coil, a current coil constructed of two sections each having an equal number of turns and arranged in operative relation to the disk, a source of low-voltage A. C. connected in series with one section of said current coil, a resistor connected in series with the second section of said current coil, and current coil circuits both connected in parallel with respect to the current terminals of the meter but forming a closed series circulating current circuit among themselves.

11. In an induction watthour meter having a register mechanism, a disk for driving said register mechanism, and current terminals; the combination of a voltage coil, a current coil constructed of two sections each having an equal number of turns and arranged in operative relation to the disk, a source of low-voltage A. C. connected in series with one section of said current coil, a resistor connected in series with the second section of said current coil, current coil circuits both connected in parallel with respect to the current terminals of the meter but forming a closed series circulating current circuit among themselves, and a relay consisting of independent current coils each connected in series with each of said meter current coils and forming parts of the circulating current circuit.

12. In an induction watthour meter having a register mechanism, a disk for driving said register mechanism, and current terminals; the combination of, a voltage coil composed of two sections having an equal number of turns and arranged in operative relation to the disk, a transformer having a low voltage winding on the same core as the voltage coil of the meter, thereby utilizing the voltage coil as the high voltage coil of the transformer in addition to its function as the voltage coil of the meter, said low voltage winding being connected in series with one section of said current coil, a resistor connected in series with the other section of said current coil, and current coil circuits both connected in parallel with the respective current terminals of the meter forming a closed series circulating current circuit between themselves.

13. In a two-wire induction watthour meter having a registering mechanism, a disk for driving said registering mechanism, and current terminals; the combination of, a voltage coil, a current coil constructed of two sections each having an equal number of turns and arranged in operative relation with the disk, a transformer having two low voltage windings mounted on the same core with the potential coil, so that said potential coil serves as the high voltage winding of the transformer in addition to its function as the potential coil of the meter, said low voltage winding being connected in series with one section of said current coil, a resistor connected in series with the other section of said current coil, and both current coil circuits connected in parallel with respect to the current terminals of the meter but forming a closed series circuit between themselves.

W. C. WAGNER.
GEORGE B. SCHLEICHER.